May 9, 1939. A. KEEL 2,157,707
HYDRAULIC CONTROL VALVE
Filed Jan. 10, 1936
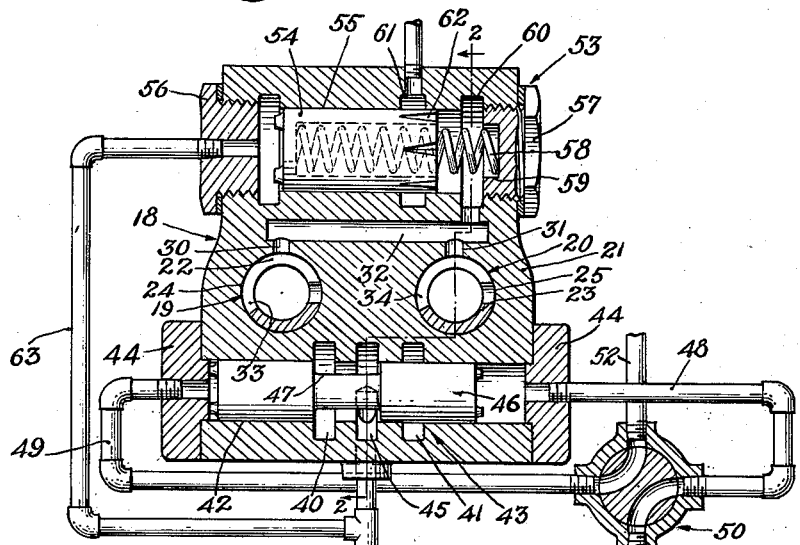
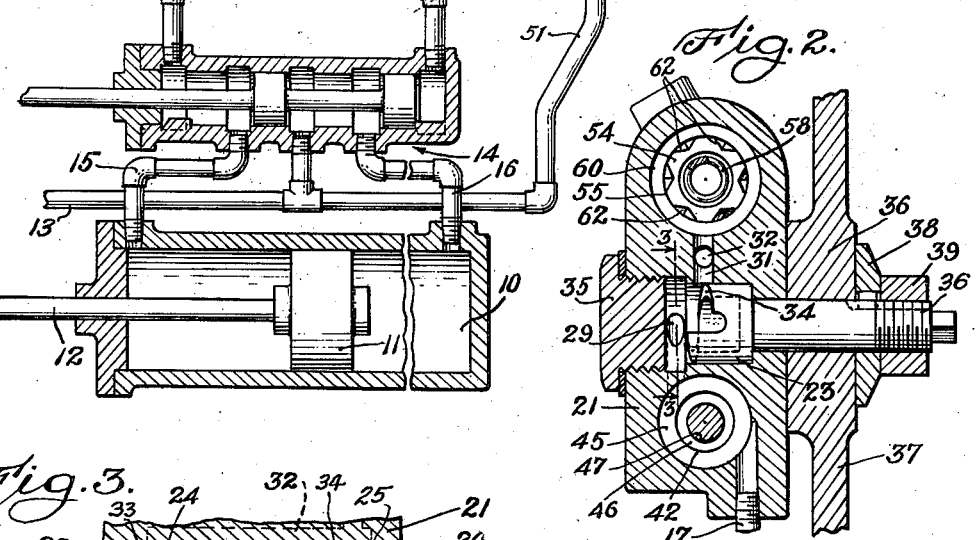
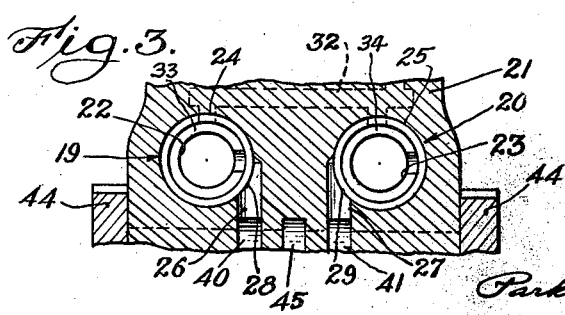
Inventor:
Adolf Keel
BY
Parker, Carlson, Pitner & Hubbard
Attorneys.

Patented May 9, 1939

2,157,707

UNITED STATES PATENT OFFICE 2,157,707

HYDRAULIC CONTROL VALVE

Adolf Keel, Highland Park, Mich., assignor to Ex-Cell-O Corporation, a corporation of Michigan Application January 10, 1936, Serial No. 58,501

5 Claims. (Cl. 121—45)

The present invention relates to improvements in control valves for hydraulic systems in machine element drives, and has particular reference to a new and improved orifice feed valve adapted to control the rate of movement by restricting the discharge flow of the fluid pressure medium.

The orifice feed valve will build up a pressure in the discharge side of the system. The rate of movement is determined by the flow through the valve, and hence by the pressure drop across the orifice means. Where the built-up pressure is constant, the pressure drop is constant. However, in practice, the built-up pressure is subject to variation due to other factors affecting the drive, and these variations tend to alter the rate of movement. One of the primary features of the present invention therefore resides in the provision of an orifice control valve having novel means for automatically maintaining a constant pressure drop across the orifice means regardless of pressure variations at the inlet.

A further object is to provide a new and improved feed control valve having a plurality of selective orifices in the discharge line of a hydraulic motor, and a governor for maintaining constant the flow characteristics of the orifices under all pressure conditions.

Still another object resides in the provision of a novel feed control valve which is adapted to be interposed in the discharge side of a hydraulic system, and which has a manually adjustable flow control orifice in front of and in series with an automatic valve for determining the pressure at the discharge side of the control orifice, and in which the automatic valve is operable by the differential of the inlet and discharge pressures of the control orifice in opposition to spring pressure to maintain said differential constant.

Further objects and advantages will become apparent as the description proceeds.

In the accompanying drawing, Figure 1 is a fragmentary sectional view of a hydraulic system with a valve embodying the features of my invention.

Fig. 2 is a transverse sectional view of the valve taken along line 2—2 of Fig. 1.

Fig. 3 is a fragmentary sectional view taken along line 3—3 of Fig. 2.

Referring more particularly to the drawing, the feed control valve, constituting the preferred embodiment of the invention, is adapted to be disposed in the path of, and to control the flow, of fluid discharged from a hydraulic motor. In the present instance, I have shown a motor of the reciprocatory type comprising a cylinder 10 and a piston 11 slidable therein. The motor is adapted particularly for driving a reciprocatory element, such as a work or tool carriage (not shown), of a machine tool, the cylinder 10 being rigidly attached to the machine base (not shown), and the piston 11 having a rod 12 attached to the carriage.

The fluid control mechanism for the motor 10, 11 may be of any suitable type, and for purposes of illustration is herein shown and described as comprising a supply line 13 which is adapted to receive a fluid working medium, such as oil, from a pressure source (not shown), and which is adapted to be connected selectively by a reversing valve 14 to one or the other of two lines 15 and 16 connected respectively to opposite ends of the cylinder 10.

The reversing valve 14 per se forms no part of the present invention, and hence the details thereof are not described. The valve 14 has a discharge line 17, and may be actuated reversibly by any suitable means (not shown) so that it will in one position connect the line 13 to the line 15 and the line 16 to the line 17 to effect movement of the piston 11 to the right, and in another position connect the lines 13 and 16 and the lines 15 and 17 (see Fig. 1) to effect movement of the piston to the left. In either position of the valve 14, the line 17 is connected to the discharge end of the cylinder 10.

The feed control valve, indicated generally at 18, is interposed in the line 17, and comprises orifice means for restricting the flow of discharge fluid from the cylinder 10 to control the rate of movement of the piston 11 and hence the machine tool carriage. In its preferred form, the valve 18 has two adjustable selective restricted orifice valves 19 and 20 housed in a body 21. The valves 19 and 20 respectively comprise hollow cylindrical plugs 22 and 23 rotatably disposed in two parallel bores 24 and 25. Two inlet passages 26 and 27 open respectively tangentially to the adjacent sides of the bores or valve chambers 24 and 25, and define longitudinally tapered ports 28 and 29. Opening respectively from the peripheries of the bases 24 and 25 are two ports 30 and 31 connected in parallel to an outlet passage 32. The plugs 22 and 23 are formed respectively with helicoidal end faces 33 and 34 which are adapted upon rotary adjustment to overlap the ports 30 and 31 varying degrees, and which coact with the latter to define adjustable restricted flow orifices.

Thus, the plug 22 may be rotatably adjusted to connect the ports 28 and 30, the helical marginal edge portion of the peripheral surface partially closing the port 30 in various degrees to obtain the desired orifice restriction, or may be rotated to close the port 30 when the valve 19 is not to be used. When different rates of carriage movement or feed are desired, the plugs 22 and 23 are adjusted to obtain orifice openings of different size through the ports 30 and 31.

To provide means for adjusting the orifice valves 19 and 20 independently, each of the plugs 22 is rotatably enclosed within the body 21 by a screw plug 35, and is provided with an axial shaft 36 journaled in and extending through a support, such as a wall 37 forming part of the machine base, to which the body 21 is suitably secured or bolted. A dial 38 is splined to the shaft 36, and is held against the wall 37 by a nut 39. The outer end of the shaft 36 is squared for engagement by a suitable manual tool (not shown). The nut 39 is loose during adjustment, and then is tightened to lock the dial 38 and the plug in place, and to obtain a tight seal between the plug and the inner end of the valve bore.

The passages 26 and 27, leading to the orifice valves 19 and 20, open in spaced relation from two annular grooves 40 and 41 in a bore 42 formed in the body 21, and constituting the chamber of an orifice selector valve 43. The opposite ends of the bore 42 are closed by apertured blocks 44. An annular groove 45 in the bore 42, intermediate the grooves 40 and 41 is connected to the line 17. Slidably disposed in the bore 42 is a valve plunger 46 formed with a peripheral groove 47 which in one end position will connect the grooves 40 and 45 and close the groove 41 to select the orifice valve 19 (see Fig. 1), and in the other end position will connect the grooves 41 and 45 and close the groove 40 to select the orifice valve 20.

To provide means for adjusting the selector valve 43, the opposite ends of the bore 42 are connected respectively through lines 48 and 49 to a suitable control valve 50 having a pressure inlet line 51 connected to the line 13, and having a drain line 52. The details of the valve 50 per se form no part of the present invention, and hence are not described. The valve 50 may be operated by any suitable means, and is adapted in one position to connect the lines 51 and 52 respectively to the lines 48 and 49, and in another position to reverse the connections.

In the operation of the motor 10, 11, the discharge of fluid is controlled by the flow law of orifices. The restriction to flow causes pressure to build up in the discharge end of the cylinder 10, and resist the movement of the pistons 11 by the fluid in the pressure end. The rate of travel is therefore controlled and determined by the size of the particular orifice connected in the discharge line by the selector valve 43. Since there are two adjustable orifice valves, two different rates of feed or traverse are available, and each is subject to individual adjustment.

The pressure is also influenced by the working resistance set up in the machine operation by the engagement between the tool and the work. If this working resistance varies, the pressure drop across the orifice tends to vary with the result that a constant speed will not be obtained. Thus, when the tool leaves the work, the working resistance ceases, and the speed of the piston tends to increase. This tends to increase the pressure in the discharge end of the cylinder 10 and hence the pressure drop across the orifice, thereby tending to cause an increase in the rate of fluid discharge.

The maintenance of a constant speed of travel is very desirable, and hence one of the primary features of the present invention resides in the provision of means for maintaining a constant pressure drop across the orifice valve 19 or 20. In the present instance, this means comprises a governor valve 53 which is automatically operable in response to the differential between the pressures at opposite sides of the orifice valves to control the pressure in the orifice discharge passage 32.

The governor valve 53 comprises a hollow plunger 54 reciprocably disposed in a bore 55 formed in the body 21, and closed at opposite ends by plugs 56 and 57. One end of the plunger 54 is closed and adapted to seat against the plug 56. A coiled compression spring 58 is seated at one end in a recess 59 in the plug 57, and at the other end against the inner face of the closed end of the plunger 54, and tends to urge the latter to the left. The passage 32 from the orifice valves 19 and 20 opens to an annular groove 60 in the right end of the bore 55. Formed in the bore 55 adjacent the right end is a second annular groove 61 which opens to the drain. A plurality of peripherally spaced generally longitudinally V-shaped notches 62 are formed in the periphery of the right end of the plunger 54, and are movable into various degrees of communication with the groove 61 to provide a restricted orifice valve connection between the passage 32 and the drain of progressively increasing size as the plunger is moved to the left under the influence of the spring 58. The left end of the bore 55 is connected through a line 63 to the line 17 at the inlet side of the valve 43.

In operation, when the motor 10, 11 is idle, no pressure will exist in the lines 17 and 63, and hence the passage through the notches 62 will be wide open. When movement is instituted, pressure will be created in the line 17, and will tend to urge the plunger 54 to the right against the action of the spring 58. For a given constant discharge pressure, the plunger 54 will seek a position of equilibrium defining a predetermined pressure drop across the connected orifice. If the discharge pressure should drop, the plunger 54 will move to the left, thereby increasing the opening through the notches 62 to decrease the pressure in the passage 32. Conversely, if the discharge pressure should increase, the pressure in the passage 32 will be increased. As a result, the pressure drop across the connected orifice will be maintained substantially constant to maintain a constant rate of discharge regardless of pressure fluctuations in the discharge end of the cylinder, and thereby to maintain a substantially constant rate of piston travel under varying conditions.

I claim as my invention:

1. In combination with a line adapted to receive fluid expelled from a reciprocatory hydraulic motor for translating a machine element, two adjustable orifice valves, means for selectively connecting one or the other of said valves to said line to restrict the discharge of the fluid in accordance with the flow law of orifices, and means responsive to the pressure in said line at the inlet side of said orifice valves for automatically regulating the pressure at the discharge side of said valves to maintain a substantially constant pressure drop across said valves.

2. An orifice feed valve comprising, in combination, a body having a selector valve chamber, two orifice valve chambers and a governor valve chamber, an inlet passage opening to said first mentioned chamber, two outlet passages connecting said first mentioned chamber to said orifice valve chambers, a third passage opening in parallel from said orifice valve chambers to said governor valve chamber, and a drain passage opening from said last mentioned chamber, a selector valve member adjustably mounted in said first mentioned chamber for connecting said inlet passage selectively to one or the other of said outlet passages, two independently adjustable orifice valve members mounted in said orifice valve chambers, a governor valve member adjustably mounted in said governor valve chamber, spring means tending to bias said governor valve member in one direction to increase the discharge opening to said drain passage, and a cross passage connecting said inlet passage to said governor valve chamber to supply pressure fluid tending to adjust said governor valve member against the action of said spring means.

3. In combination with a line adapted to receive fluid expelled from a hydraulic motor for translating a machine element, a plurality of parallel orifice valves each of which is adapted to be operatively connected in said line to establish an independent path of flow and when so connected is adapted to restrict the flow of fluid through said line in accordance with the flow law of orifices, adjustable means for connecting said valves selectively in said line, and means automatically operable to maintain a substantially constant pressure differential across said valves for any given adjustment of said first mentioned means regardless of pressure fluctuations.

4. In combination with a line adapted to receive fluid expelled from a hydraulic motor for translating a machine element, a plurality of parallel orifice valves each of which is adapted to be operatively connected in said line to establish an independent path of flow and when so connected is adapted to restrict the flow of fluid through said line in accordance with the flow law of orifices, means for selectively connecting said valves in said line, and valves means in said line in series with said orifice valves and automatically adjustable in response to pressure fluctuations in said line to maintain a substantially constant pressure differential across said orifice valves for any given selective connection of said orifice valves.

5. In combination with a line adapted to receive fluid expelled from a reciprocatory hydraulic motor for translating a machine element, a reversing valve for connecting said line selectively to opposite ends of said motor, a plurality of parallel orifice valves each of which is adapted to be operatively connected in said line to establish an independent path of flow and when so connected is adapted to restrict the flow of fluid through said line in accordance with the flow law of orifices, adjustable means for connecting said valves selectively in said line, and means automatically operable to maintain a substantially constant pressure differential across said valves for any given adjustment of said first mentioned means regardless of pressure fluctuations.

ADOLF KEEL.